United States Patent
Natori et al.

(10) Patent No.: US 6,519,451 B1
(45) Date of Patent: Feb. 11, 2003

(54) RECEIVING METHOD AND RECEIVING APPARATUS

(75) Inventors: Makoto Natori, Saitama (JP); Kazuhiko Terashima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/516,517

(22) Filed: Mar. 1, 2000

(30) Foreign Application Priority Data

Mar. 1, 1999 (JP) .......................................... 11-053266

(51) Int. Cl.[7] .............................. H04Q 7/20; H04Q 7/32
(52) U.S. Cl. ...................... 455/303; 455/67.3; 455/296; 455/504; 455/63
(58) Field of Search ................................ 455/303, 67.3, 455/501, 63, 296, 506, 10, 132, 133, 135, 500, 504, 65, 550, 403, 422

(56) References Cited

U.S. PATENT DOCUMENTS 5,264,857 A * 11/1993 Baghdady ................... 455/303
5,671,221 A * 9/1997 Yang .......................... 455/63
6,047,019 A * 4/2000 Ishii ........................... 455/63

* cited by examiner

Primary Examiner—William Trost
Assistant Examiner—Keith Ferguson
(74) Attorney, Agent, or Firm—Jay H. Maioli (57) ABSTRACT

A receiving method and a receiving apparatus suitable for reception of a radio signal in environment where fading occurs, such as CDMA (Code Division Multiple Access). Includes prioritizing a plurality of received paths, setting an inhibition timing region having a predetermined time interval in a section before and after at least the highest-priority received path in accordance with the result of prioritization, and inhibiting the other received paths from being obtained in the set inhibition timing region, whereby each received path is always received with valid timing. Moreover, the setting of reception timing by a timing setting device is controlled so that the other received paths may not be present in the set inhibition timing region, whereby the reception timings of a plurality of receivers are always set to valid timings.

10 Claims, 6 Drawing Sheets

FIG.2

FIG. 3A  No Change (0)

FIG. 3B  Forward Tracking (-1)

FIG. 3C  Backward Tracking (+1)

RECEIVING METHOD AND RECEIVING APPARATUS

BACKGROUND OF THE INVENTION

1. Field of the Invention

The invention relates to a receiving method and a receiving apparatus which are suitable for reception of a radio signal transmitted by CDMA (Code Division Multiple Access), for example. More particularly, this invention relates to a technique suitable for the reception in environment where fading occurs.

2. Description of the Related Art

Heretofore, an approach has been adopted in order to excellently receive a radio signal transmitted by CDMA in a multipath environment where fading occurs, such as a mobile unit. This approach is that a plurality of paths are separately received by a plurality of receive sections in a receiver and then a plurality of received paths are combined with one another, whereby received data is obtained. Receiving is performed by combining such a plurality of paths with one another, whereby good receiving properties are ensured even in the multipath environment.

On the other hand, the path frequently is suddenly present moves or disappears in the multipath environment where the fading occurs. To obtain the received data by the above-mentioned combination of a plurality of paths in such a multipath environment, it is important to appropriately select a plurality of paths. However, it cannot be necessarily said that the conventional receiving can appropriately select the path. That is, it is difficult to resolve the path having the time shorter than resolution of a symbol rate of the transmitted data, for example. During the reception and combination of each multipath, the received data with timing closer than the symbol rate becomes redundant and thus a useless combination takes place. Moreover, a circuit for receiving each path may receive the paths with the same timing. Also in such a case, the useless combination occurs.

The reception of the signal transmitted by CDMA has been described above as an example. However, the same problem exists when the radio transmitted signal digital-modulated by various types of schemes is received in the environment where the fading occurs.

SUMMARY OF THE INVENTION

It is an object of the invention to enable only a valid path to be appropriately selected and received in receiving a multipath signal.

A receiving method of the invention comprises the steps of: prioritizing a plurality of received paths; setting an inhibition timing region having a predetermined time interval in a section before and after at least the highest-priority received path in accordance with the result of prioritization; and inhibiting the other received paths from being obtained in the set inhibition timing region. Therefore, each received path is always received with valid timing. Moreover, the setting of reception timing by timing setting means is controlled so that the other received paths may not be present in the set inhibition timing region, whereby the reception timings of a plurality of receiving means are always set to valid timings.

DETAILED DESCRIPTION OF THE PREFERRED EMBODIMENTS

Figure 1:
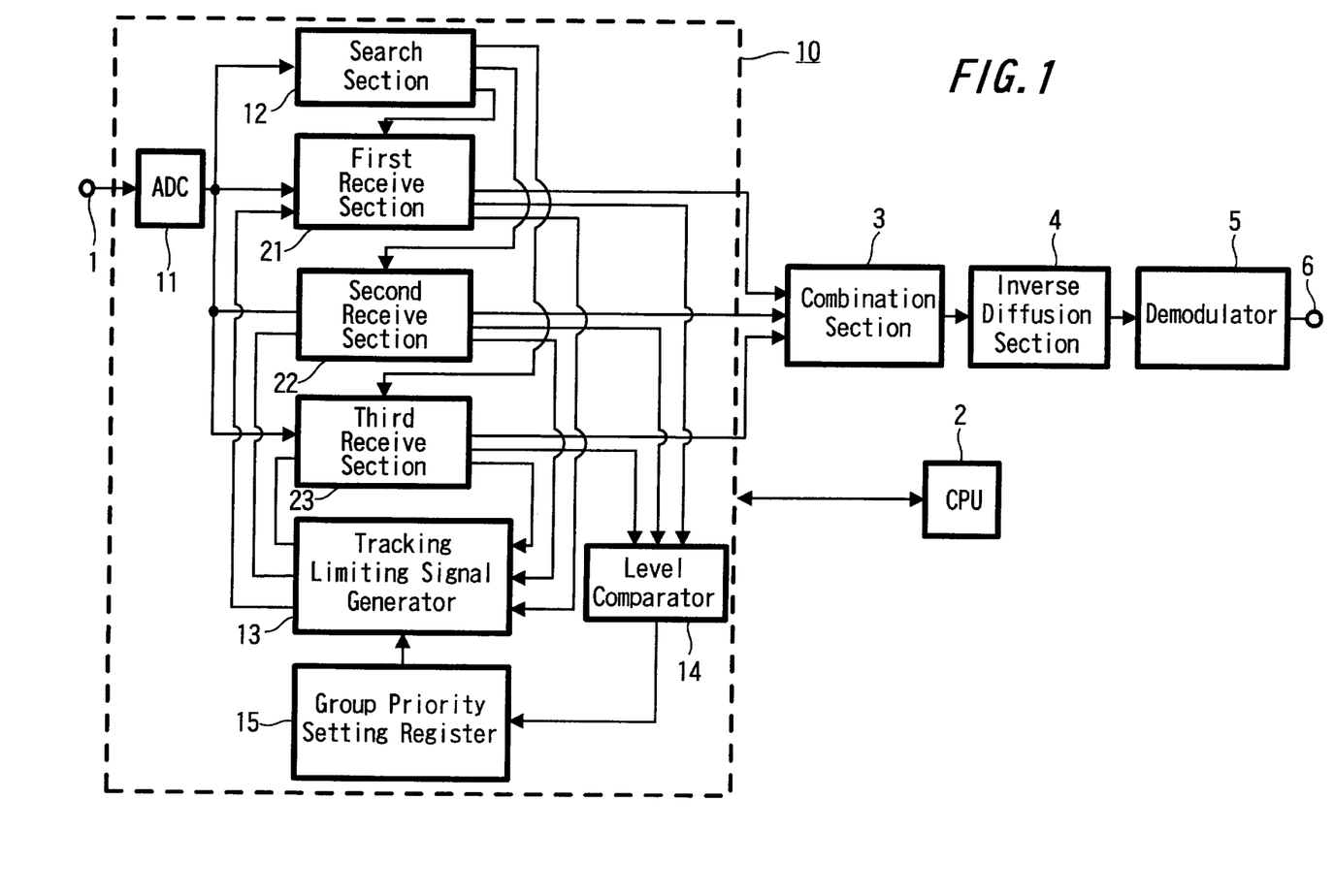
FIG. 1 is a block diagram of an example of the whole constitution according to one embodiment of the invention.

An embodiment of the invention is applied to a receiving apparatus for receiving digital data transmitted by CDMA. FIG. 1 shows the whole constitution of the receiving apparatus of this embodiment. An input terminal 1 receives a predetermined channel and obtains a frequency-converted base band signal (an I component and a Q component). This base band signal is supplied to a receiving section 10. The digital data is sampled by an analog-to-digital converter 11 in the receiving section 10. The analog-to-digital converter 11 of this embodiment obtains n-by-fs data stream applied to n-times-oversampling (n is an integer), where fs denotes a sampling frequency of the transmitted digital data.

The data stream outputted by the analog-to-digital converter 11 is supplied to a search section 12 and first, second and third receive sections 21, 22 and 23. The search section 12 searches for timing of a received path and supplies the timing data to the receive sections 21, 22 and 23. The receive sections 21, 22 and 23 output the data received with the timing indicated by the search section 12. The output data are combined with one another by a combination section 3. The resultant signal obtained from the combination section 3 is inversely diffused by an inverse diffusion section 4. The received signal inversely diffused is supplied to and demodulated by a demodulator 5. The demodulated received data is obtained by an output terminal 6.

The receiving by the receive sections 21, 22 and 23 in the receiving section 10 is controlled by a central control unit 2 of the receiving apparatus. A tracking limiting signal generator 13, a level comparator 14 and a group priority setting register 15 are included in the receiving section 10 in order that the receive sections 21, 22 and 23 may properly receive the path under the control of the central control unit 2. The tracking limiting signal generator 13 determines the highest-priority path and the second-highest-priority path in the signals received by the receive sections 21, 22 and 23. Then, the tracking limiting signal generator 13 generates a tracking limiting signal before and after the timing of reception of the high-priority paths. The reception by the other receive sections is limited within a range indicated by the tracking limiting signal. For example, the range, in which the reception of the other paths is limited by the tracking limiting signal, is set to a time interval having a sampling section in which an amount of interference between codes of the received data is a predetermined level or more (the level incapable of good reception or more) so that a plurality of paths may not be included in the section in which the amount of interference between the codes is a predetermined level or more.

The priority data, which are set in the group priority setting register 15 in accordance with the result of comparison made by the level comparator 14, are used to determine the priority. The level comparator 14 compares the respective output levels (receiving power) of the receive sections 21, 22 and 23. Thus, the level comparator 14 selects the path in order of decreasing level, i.e., in order of priority.

After the priority is determined, the tracking limiting signal is generated in order of priority, the highest-priority path first. For example, when the path received by the first receive section 21 has the highest priority, the timing of reception of the highest-priority path is set to a reference position and the tracking limiting signal is generated at a predetermined time interval before and after the reference position. Then, the tracking limiting signal is supplied to the other receive sections 22 and 23, thereby causing the receive sections 22 and 23 to perform the receiving with the reception timing out of the range inhibited by the tracking limiting signal. Within this limit, when the path received by the second receive section 22 has the second highest priority, the reception timing of the second-highest-priority path is set to the reference position and the tracking limiting signal is generated at a predetermined time interval before and after the reference position. Then, the tracking limiting signal is also supplied to the other receive section 23, thereby causing the receive section 23 to perform the receiving with the reception timing out of the range inhibited by the tracking limiting signal. Therefore, in this example, two tracking limiting signals are supplied to the receive section 23 which receives the lowest-priority path, thereby causing the receive section 23 to perform the receiving with the timing out of the range inhibited by the two tracking limiting signals.

Figure 2:
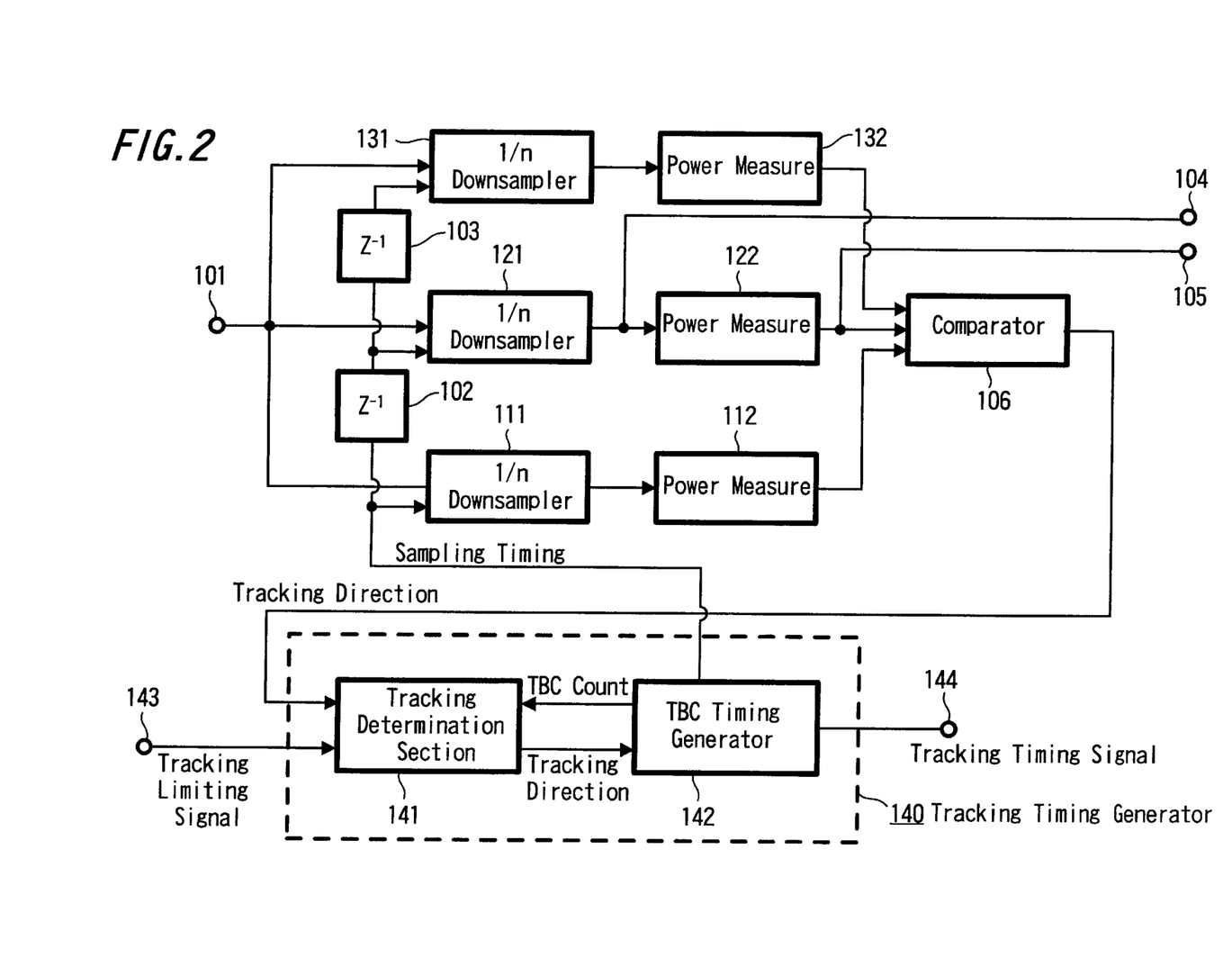
FIG. 2 is a block diagram of an example of the constitution of each receive section according to one embodiment of the invention.

FIG. 2 shows the constitution of each of the receive sections 21, 22 and 23 in the receiving section 10. The receive sections 21, 22 and 23 have the same constitution. FIG. 2 shows the constitution of one receive section. The data stream obtained by an input terminal 101 of the receive section is supplied to three downsamplers 111, 121 and 131. Each of the downsamplers 111, 121 and 131 downsamples the data stream applied to the n-times-oversampling by the preceding analog-to-digital converter 11, thereby obtaining 1/n data stream. Sampling timing is controlled by sampling timing data supplied from a time base counter and a timing generator 142 in a tracking timing generator 140. The time base counter and the timing generator 142 are each a circuit including the time base counter (TBC). This time base counter counts reference timing. The timing of start of the reception is set by the timing generator 142 in accordance with the result of search made by the search section 12.

The sampling timing data outputted by the timing generator 142 is supplied directly to the downsampler 111, to the downsampler 121 through one delay circuit 102 and to the downsampler 131 through two delay circuits 102 and 103. The constitution is adapted to perform such a supply of the sampling timing data, whereby the timings of sampling by the downsamplers 111, 121 and 131 are shifted by one oversampling interval.

The data streams sampled by the downsamplers 111, 121 and 131 are supplied to separate power measures 112, 122 and 132. The measured power is supplied to a comparator 106. The comparator 106 supplies the result of comparison of the power of three data streams to a tracking determination section 141 in the tracking timing generator 140. The result of comparison of the power, the tracking limiting signal inputted from the tracking limiting signal generator 13 to a terminal 143 and a time base count from the timing generator 142 are supplied to the tracking determination section 141. Then, the data for setting the direction in which the timing of reception is caused to track is supplied from the tracking determination circuit 141 to the timing generator 142 so as to allow the reception with the timing with which the receiving power of the downsampler 121 for sampling with intermediate timing has the highest level. Thus, the timing generator 142 changes the sampling timing indicated by the sampling timing data in accordance with the tracking direction data.

The sampling timing data set by the timing generator 142 is supplied from an output terminal 144 to the tracking limiting signal generator 13 (see FIG. 1) as a tracking timing signal.

Then, the data stream sampled by the downsampler 121 under such a control is supplied from an output terminal 104 to the combination section 3 shown in FIG. 1. The combination section 3 combines the received data streams. Moreover, the data on the result of measurement, which the power measure 122 obtains by measuring the receiving power of the data stream sampled by the downsampler 121, is supplied from an output terminal 105 to the level comparator 14 shown in FIG. 1. The level comparator 14 determines the path having a high receiving level (receiving power).

Figures 3A, 3B:
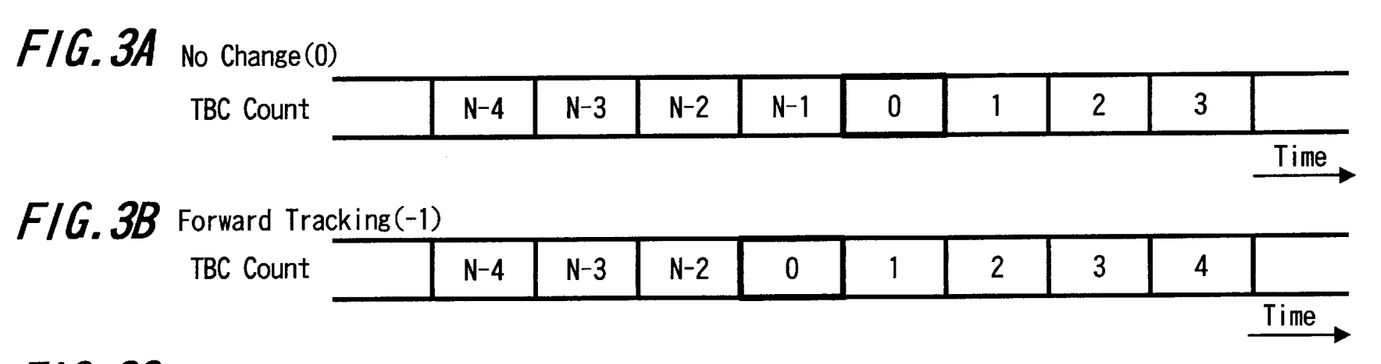
FIGS. 3A to 3C are timing charts of an example of a tracking operation according to one embodiment of the invention.
Figure 3C:
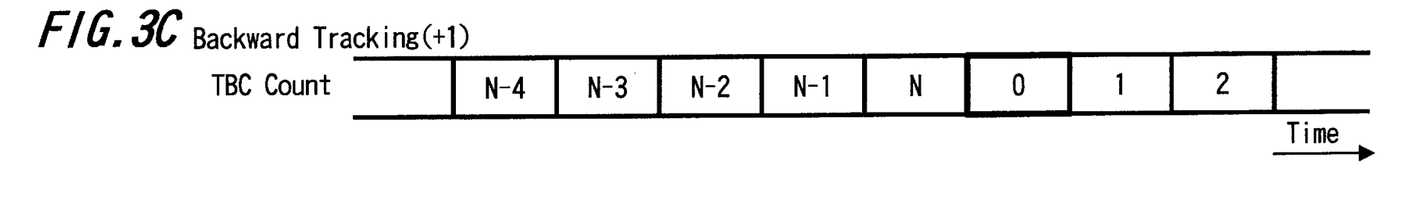

An example of a status in which tracking timing is generated in the tracking timing generator 140 will be now described with reference to FIGS. 3A to 3C. A change in the tracking timing in the timing generator 142 is accomplished by changing a count cycle of the time base counter. That is, when the tracking timing does not change, the time base counter repeats the count of from 0 to N−1 as shown in FIG. 3A, where N denotes the count cycle of the time base counter in the timing generator 142. The timing of the count 0 is the timing of reception.

When it is necessary to advance the timing (i.e., when the timing needs to track forward), the count 0 is set so as to be next to the count N−2 as shown in FIG. 3B, whereby the count cycle is reduced. Furthermore, when it is necessary to delay the timing (i.e., when the timing needs to track backward), the count N is set so as to be next to the count N−1 and the count 0 is set so as to be next to the count N as shown in FIG. 3C, whereby the count cycle is increased. In this manner, the reception timing is advanced or delayed for each oversampling cycle, whereby the timing is adjusted. For a basic tracking operation in each receive section, the timing is adjusted so that the data sampled by the downsampler 121 may have the highest receiving level. During adjustment, a tracking status is limited by the tracking limiting signal supplied from the tracking limiting signal generator 13.

Figure 4A:
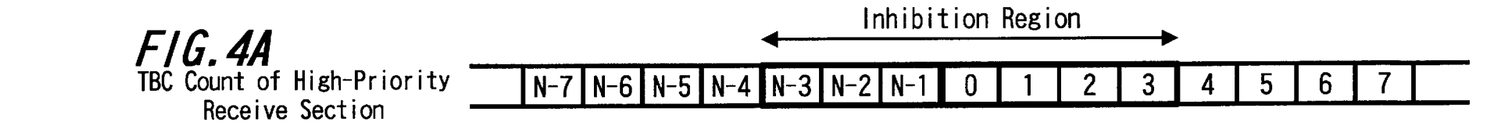
FIGS. 4A to 4F are timing charts of an example of a limit setting status according to one embodiment of the invention.
Figure 4B:
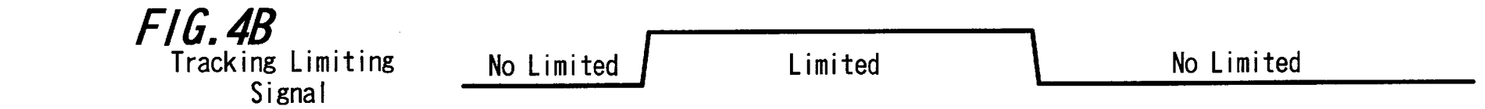

Next, the tracking operation under limitation will be described with reference to FIGS. 4A to 4F. First, it is assumed that the count of the time base counter of the highest-priority receive section is in a state shown in FIG. 4A. In this state, it is assumed that the range of from the count N−3 to the count 3 centered at the count 0 is a region where the reception of the other paths is inhibited. When the region where the reception is inhibited is set in this manner, the tracking limiting signal enters a state shown in FIG. 4B. This tracking limiting signal is outputted from the tracking limiting signal generator 13 in the receiving section 10 to the receive section for receiving any path other than the highest-priority path. In this state, because of the limitation based on the count of the time base counter, the inhibition region shown in FIG. 4A is slightly shifted from the range limited by the limiting signal shown in FIG. 4B.

Figure 4C:
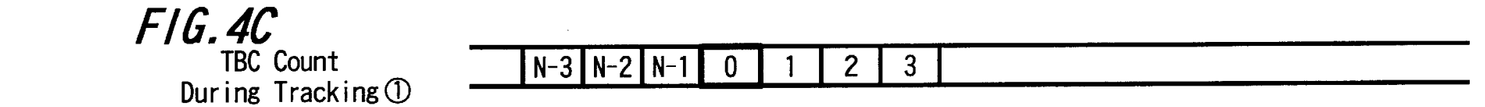
Figure 4D:
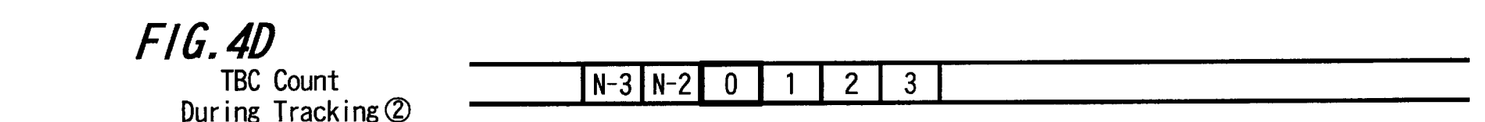
Figure 4E:
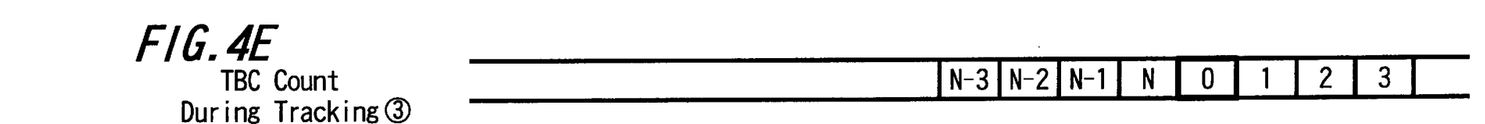
Figure 4F:
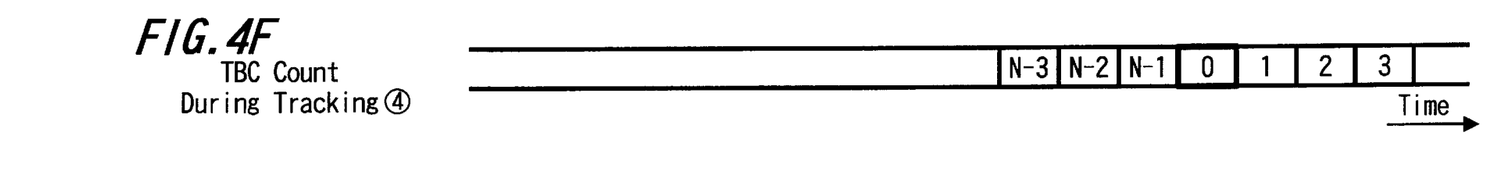

When the time base count, the reception timing of the other receive sections is in a state shown in FIG. 4C, for example, these receive sections enter a state in which backward tracking is limited. Thus, the timing of the count 0 of the time base counter is inhibited from being within the inhibition region. When the time base count, the reception timing of the other receive sections is in a state shown in FIG. 4D, for example, these receive sections enter a forward tracking state regardless of the result of comparison. When the time base count, the reception timing of the other receive sections is in a state shown in FIG. 4E, for example, these receive sections enter a backward tracking state regardless of the result of comparison. When the time base count, the reception timing of the other receive sections is in a state shown in FIG. 4F, for example, these receive sections enter a state in which forward tracking is limited.

Table 1 shows conditions of the states on which these limits are imposed. The state shown in FIG. 4C corresponds to a condition 2 in Table 1. The state shown in FIG. 4D corresponds to a condition 3 in Table 1. The state shown in FIG. 4E corresponds to a condition 5 in Table 1. The state shown in FIG. 4F corresponds to a condition 6 in Table 1. Although not shown in FIGS. 4A to 4F, a condition 1 in Table 1 has no limit. Thus, the tracking based on the result of comparison in each receive section is performed. Under a condition 4 in Table 1, the count 0 of the time base counter remains in the inhibition region. Thus, determination is made that the timing disappears, and the central control unit 2 is informed of this determination.

TABLE 1

| | Limiting timing signal | | | Tracking direction under limitation | |
|---|---|---|---|---|---|
| TBC count | N-1 | N-2 | N-3 | Result of comparison | After limitation |
| Condition 1 | Not limited | Not limited | Not limited | | Not limited |
| Condition 2 | Not limited | Not limited | Limited | | +1 → 0 |
| Condition 3 | Not limited | Limited | Limited | | 0, +1 → −1 |
| Condition 4 | Limited | Limited | Limited | | Disappear |
| Condition 5 | Limited | Limited | Not limited | | −1, 0 → +1 |
| Condition 6 | Limited | Not limited | Not limited | | −1 → 0 |

Relationship between limiting timing signal and limit to tracking operation

Figure 5A:
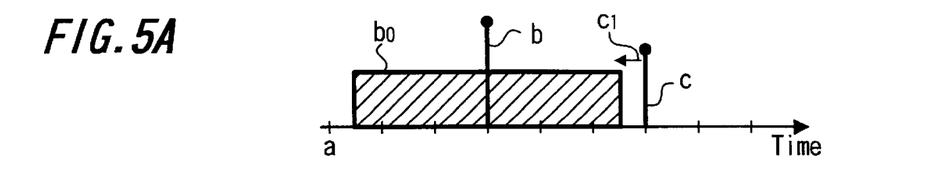
FIGS. 5A and 5B are timing charts of an example of reception according to one embodiment of the invention.
Figure 5B:
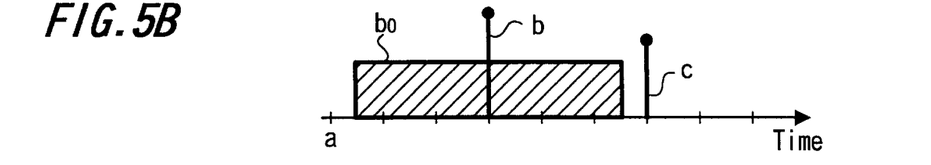

Next, the examples of an actual tracking operation in the constitution adapted to thus limit the tracking will be described with reference to FIGS. 5A to 7B. In each drawing, the timing indicated by a is the reference timing. For example, as shown in FIG. 5A, when a path b having the highest priority is present, it is assumed that an inhibition region b0 having a predetermined interval is set before and after the path b. In this case, it is assumed that another receive section receives a path c with the timing immediately after the inhibition region b0. When the control functions so as to perform forward tracking c1 in accordance with the determination of the path c in the receive section, the tracking takes place so that the timing may enter the inhibition region b0. Thus, as shown in FIG. 5B, the timing of reception of the path c in the receive section is limited as it is.

Figure 6A:
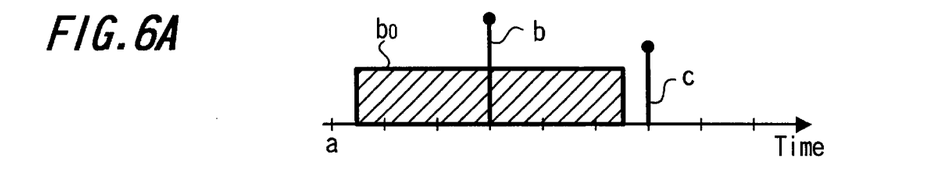
FIGS. 6A and 6B are timing charts of an example of reception according to one embodiment of the invention.
Figure 6B:
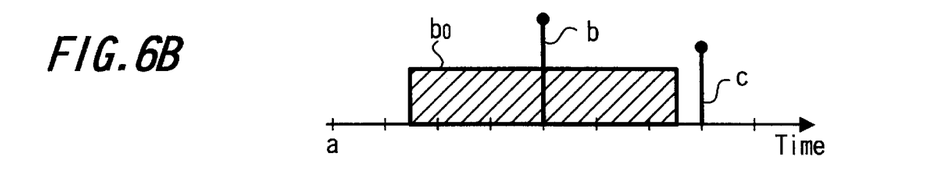

Another example is shown in FIGS. 6A and 6B. As shown in FIG. 6A, when the highest-priority path b is present, it is assumed that the inhibition region b0 having a predetermined interval is set before and after the path b. In this case, it is assumed that another receive section receives the path c with the timing immediately after the inhibition region b0. As shown in FIG. 6B, it is assumed that the position of reception of the path b is shifted backward by the tracking operation in the receive section receiving the path b. In this case, the reception timing of the path c is shifted backward as shown in FIG. 6B.

Figure 7A:
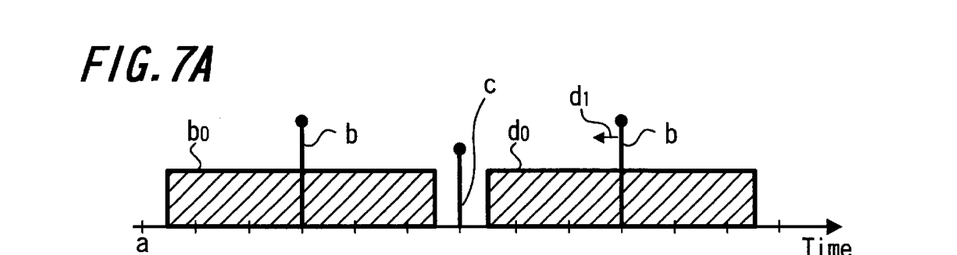
FIGS. 7A and 7B are timing charts of an example of reception according to one embodiment of the invention.
Figure 7B:
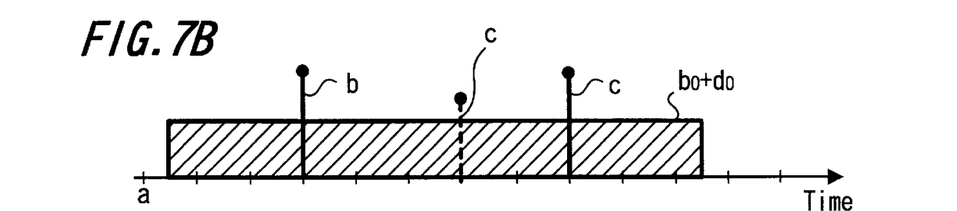

FIGS. 7A and 7B show the state in which there are two inhibition regions, i.e., the inhibition region set for the highest-priority path and the inhibition region set for the second-highest-priority path. For example, as shown in FIG. 7A, when the highest-priority path b is present, it is assumed that the inhibition region b0 having a predetermined interval is set before and after the path b. Also, when a path d having the second highest priority is present, it is assumed that an inhibition region d0 having a predetermined interval is set before and after the path d. It is assumed that the timing of reception of the third path c is located between the inhibition regions b0 and d0. In this case, as shown in FIG. 7B, it is assumed that the timing of reception of the second-highest-priority path d enters a region b0+d0 having the continuous inhibition regions b0 and d0 by forward tracking d1 in accordance with the determination of the path d in the receive section. After such a change, the intermediate received path c is completely within the inhibition region. Thus, the timing of reception of the path c disappears. Thus, the reception timing of the receive section receiving the path c is reset to quite a different timing.

Such receiving allows the following implementation. Even if a plurality of paths are present adjacent to one another due to the amount of interference between the codes (resolution of a symbol rate) or the like, the presence of a plurality of paths is limited in the case of a situation where it is difficult to separately obtain the data of the paths and combine these data with one another. Thus, the paths are spaced away from one another. Consequently, the timing of reception of a plurality of paths is set to good timing in a multipath environment. In this case, the timing setting of this embodiment is completed in the receiving section 10, and thus the timing is set without the use of the central control unit 2. Therefore, a load on the central control unit 2 for controlling the timing setting is reduced.

In the above-described embodiment, the inhibition region is set in order of priority, the highest-priority path first. Thus, the lower-priority paths are received out of the inhibition region. However, the inhibition region may be set for at least only the highest-priority path, and the control may be performed so that the other paths may not enter the inhibition region.

Moreover, in the above-described embodiment, it is assumed that the time interval of the inhibition region is a fixed interval. However, the time interval of the inhibition region may be changed in accordance with the state of reception. For example, when the state of multipath generation, which the search section 12 searches for, is the state in which a plurality of paths are close to one another in a narrow range, the control may be performed so as to reduce the time interval of the inhibition region. On the other hand, when the state of multipath generation, which the search section 12 searches for, is the state in which a plurality of paths are dispersed in a wide range, the control may be performed so as to increase the time interval of the inhibition region.

Moreover, in the above-described embodiment, the high-priority path is determined in accordance with the determination of the receiving level. However, the high-priority path may be determined in accordance with other determinations.

Moreover, in the example shown in FIG. 1, three receive sections 21, 22 and 23 are included in the receiving section 10, and the control is performed so that the timings of received paths in the three receive sections may not be close to one another. However, the invention can be also applied to the constitution in which more receive sections are included in the receiving section in one receiving apparatus and thus more received paths are simultaneously obtained. Even if any number of receive sections is included, a predetermined number of inhibition regions can be set in order of priority, the highest-priority path first so that the lower-priority paths are received out of the inhibition region.

Figure 8:
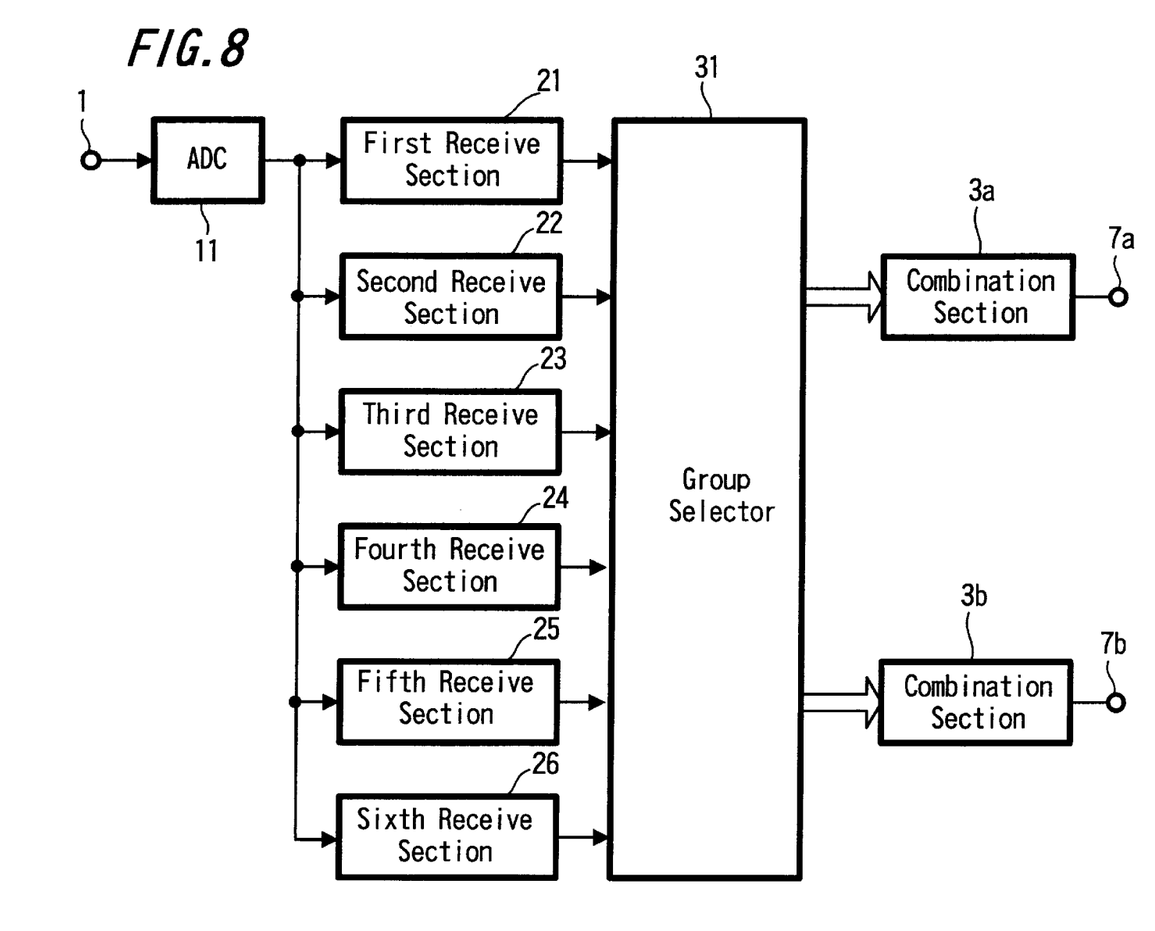
FIG. 8 is a block diagram of an example of the constitution according to another embodiment of the invention.

FIG. 8 shows the example of the constitution including six receive sections 21, 22, 23, 24, 25 and 26. When many receive sections 21 to 26 are thus included, the outputs of the receive sections 21 to 26 are supplied to a group selector 31. Then, the outputs are divided into the paths to be combined by a first combination section 3a and the paths to be combined by a second combination section 3b in accordance with the state of reception. Thus, an output terminal 7a of the received data combined by the first combination section 3a and an output terminal 7b of the received data combined by the second combination section 3b are obtained. For example, the paths obtained by four receive sections 21 to 24 are assigned to the reception of a data channel, and the paths obtained by two receive sections 25 and 26 are assigned to the reception of a control channel. Such a variable assignment may be performed so that the paths are prioritized in an assigned group and the inhibition region is set.

Moreover, in the above-described embodiment, the invention is applied to the receiving apparatus for receiving the signal transmitted by CDMA. However, the invention can be applied to the receiving apparatus using any scheme as long as the scheme permits the same combination of a plurality of paths.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A receiving method for receiving a radio signal over a plurality of received paths with different reception timings and for combining said plurality of received paths with one another, thereby obtaining a received signal, the method comprising the steps of:
    prioritizing said plurality of received paths;
    setting an inhibition timing region having a predetermined time interval before and after a highest-priority received path in accordance with a result of the step of prioritizing; and
    inhibiting ones of the plurality of received paths other than the highest-priority received path from being obtained in said set inhibition timing region.

2. The receiving method according to claim 1, wherein the predetermined time interval of said inhibition timing region is set to a time interval having a sampling section in which an amount of interference between codes of received data exceeds a predetermined level.

3. The receiving method according to claim 1, further comprising the steps of:
    determining an interval having a plurality of received paths, and
    variably setting the time interval of said inhibition timing region in accordance with the interval determined in the step of determining.

4. The receiving method according to claim 1, wherein said step of prioritizing is performed in accordance with a receiving level of each of the plurality of received paths.

5. The receiving method according to claim 1, further comprising the steps of:
    obtaining a second-priority received path at a time other than a first inhibition timing region set for said highest-priority received path, setting a second inhibition timing region having a predetermined time interval at a time before and after the second-priority received path, and
    obtaining a third-priority received path and lower-priority received paths at times other than said first and second inhibition timing regions.

6. A receiving apparatus comprising:
    a plurality of receiving means for individually obtaining signals over a plurality of received paths;
    timing setting means for individually setting respective reception timings of said plurality of receiving means;
    prioritizing means for prioritizing the plurality of received paths obtained by said plurality of receiving means; and
    controlling means for setting an inhibition timing region having a predetermined time interval before and after a highest-priority received path in accordance with a result of prioritization set by said prioritizing means and for controlling the setting of reception timings by said timing setting means, so that other received paths of the plurality of received paths are not present in said inhibition timing region.

7. The receiving apparatus according to claim 6, wherein the predetermined time interval of said inhibition timing region set by said controlling means is a time interval having a sampling section in which an amount of interference between codes of received data exceeds a predetermined level.

8. The receiving apparatus according to claim 6, wherein said controlling means includes means for determining an interval having a plurality of received paths and for variably setting the time interval of said inhibition timing region in accordance with the determined interval.

9. The receiving apparatus according to claim 6, wherein said prioritizing means comprises means for determining a receiving level of each of the plurality of received paths.

10. The receiving apparatus according to claim 6, wherein said controlling means includes means for controlling so that the reception timing of a second-priority received path is set at a time other than a first inhibition timing region set for said highest-priority received path, so that a second inhibition timing region having a predetermined time interval is set before and after the second-priority received path, and so that timings of reception of a third-priority received path and lower-priority received paths is set times other than said first and second inhibition timing regions.

* * * * *